(12) United States Patent
Oh et al.

(10) Patent No.: US 6,721,384 B2
(45) Date of Patent: Apr. 13, 2004

(54) SPACER GRID WITH SIDE WELDING SUPPORT AND FLOW MIXING VANE FOR NUCLEAR REACTOR FUEL ASSEMBLY

(75) Inventors: Dongseok Oh, Daejeon-si (KR); Taehyun Chun, Daejeon-si (KR); Wangkee In, Daejeon-si (KR); Keenam Song, Daejeon-si (KR); Hyungkyu Kim, Daejeon-si (KR); Heungseok Kang, Daejeon-si (KR); Kyungho Yoon, Daejeon-si (KR); Younho Jung, Daejeon-si (KR)

(73) Assignees: Korea Atomic Energy Research Institute, Daejeon-si (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 10/281,472

(22) Filed: Oct. 25, 2002

(65) Prior Publication Data

US 2003/0138073 A1 Jul. 24, 2003

(30) Foreign Application Priority Data

Oct. 29, 2001 (KR) ........................................ 2001-66801

(51) Int. Cl.$^7$ ................................................ G21C 3/34
(52) U.S. Cl. ...................... 376/439; 376/442; 376/438; 376/462
(58) Field of Search ................. 376/439, 442, 376/438, 462

(56) References Cited

U.S. PATENT DOCUMENTS

| | | | |
|---|---|---|---|
| 4,089,741 A | 5/1978 | Patterson et al. | |
| 4,692,302 A | 9/1987 | DeMario et al. | |
| 4,728,489 A | * 3/1988 | Hatfield | 376/439 |
| 4,879,090 A | * 11/1989 | Perrotti et al. | 376/462 |
| 4,895,698 A | * 1/1990 | DeMario | 376/442 |
| 5,110,539 A | * 5/1992 | Perrotti et al. | 376/439 |
| 5,139,736 A | * 8/1992 | Bryan | 376/442 |
| 5,188,797 A | * 2/1993 | Bryan | 376/438 |
| 5,299,245 A | 3/1994 | Aldrich et al. | |
| 5,307,393 A | * 4/1994 | Hatfield | 376/442 |
| 5,402,457 A | * 3/1995 | Suchy et al. | 376/443 |
| 5,440,599 A | 8/1995 | Rodack et al. | |
| 6,236,702 B1 | 5/2001 | Chun et al. | |
| 6,278,758 B1 | * 8/2001 | Imaizumi et al. | 376/438 |
| 6,393,087 B1 | 5/2002 | Oh et al. | |

* cited by examiner

Primary Examiner—Michael J. Carone
Assistant Examiner—Rick Palabrica
(74) Attorney, Agent, or Firm—Bachman & LaPointe, P.C.

(57) ABSTRACT

A spacer grid for nuclear fuel assemblies is disclosed. This spacer grid has a plurality of side weld supports, that is, main supports, upper sub-supports and lower sub-supports, on its interlaced inner straps, with two flow mixing vanes integrally extending upward from each of the main supports. This spacer grid is fabricated by seam-welding the interlaced first and second inner straps to each other along the upper axial junction lines of the crossing main and upper sub-supports at the top of the intersections, and along the lower axial junction lines of the crossing lower sub-supports at the bottom of the intersections, thus forming side weld lines at the intersections. This spacer grid reduces the damage of fuel rod during a fuel rod insertion process by decreasing interference between flow mixing vanes and fuel rods, accomplishes a desired soundness by seam welding, improves the coolant mixing efficiency of the flow mixing vanes by excluding welding windows, and reduces hydraulic resistance caused by weld beads.

8 Claims, 8 Drawing Sheets

--Fig. 2--
Conventional Art
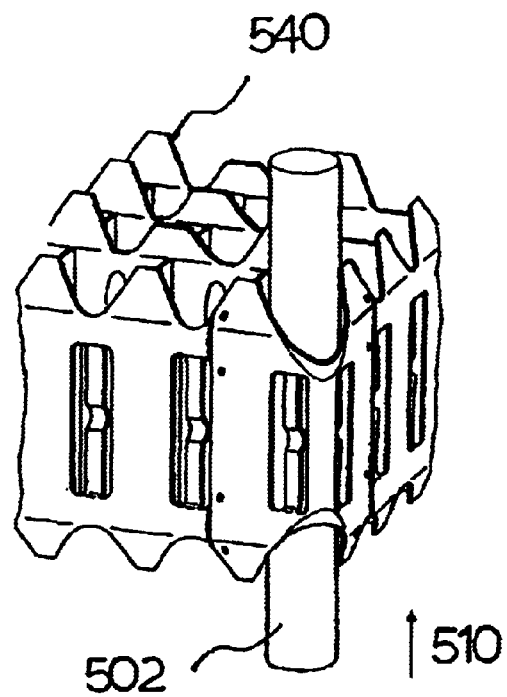
--Fig. 3--
Conventional Art
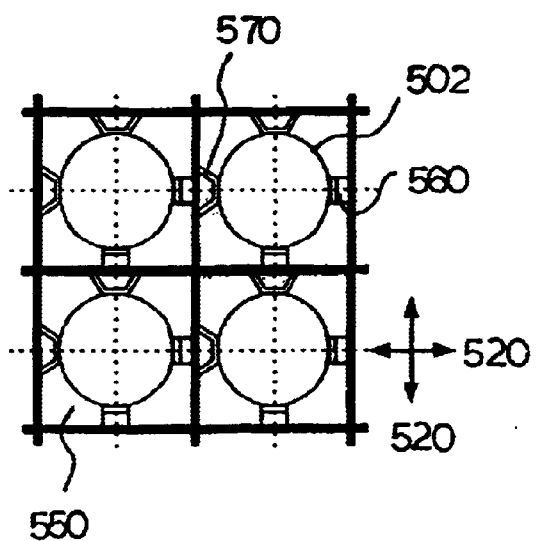

--Fig. 4--
Conventional Art
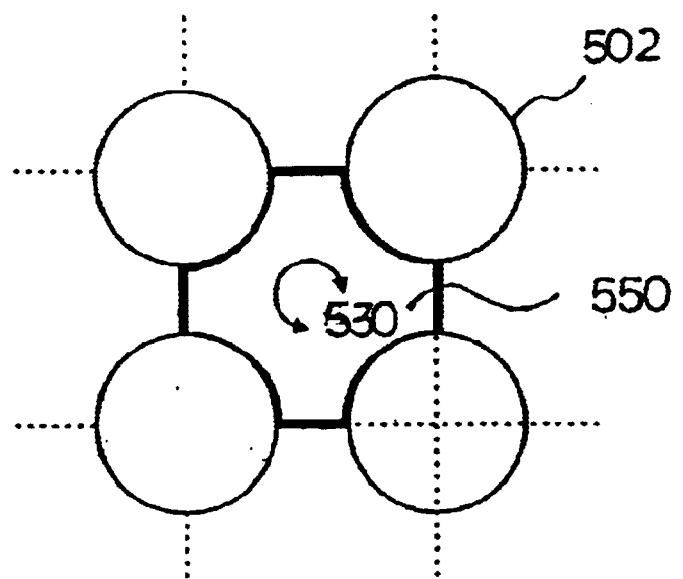
--Fig. 5--
Conventional Art
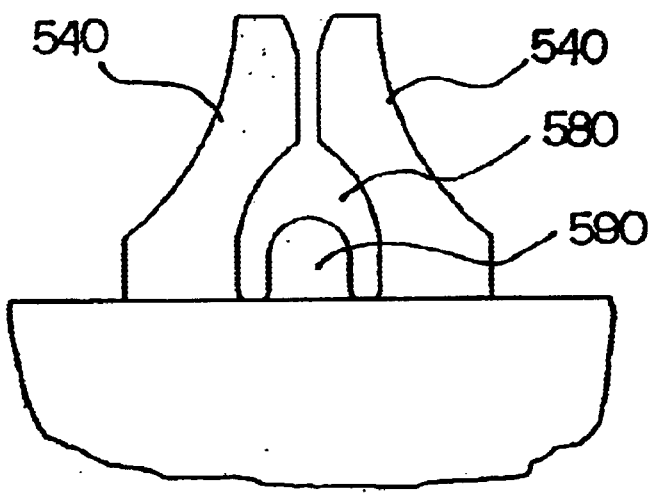

--Fig. 6--
Conventional Art
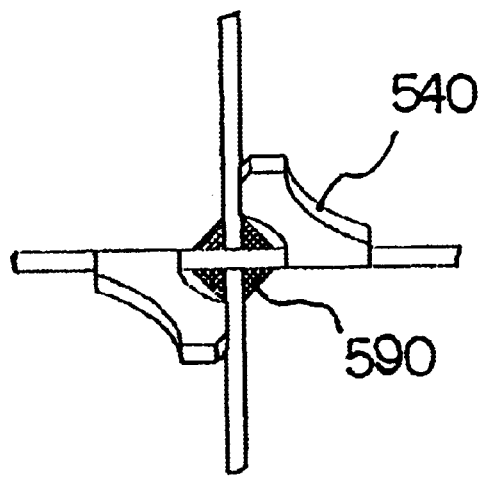
--Fig. 7--
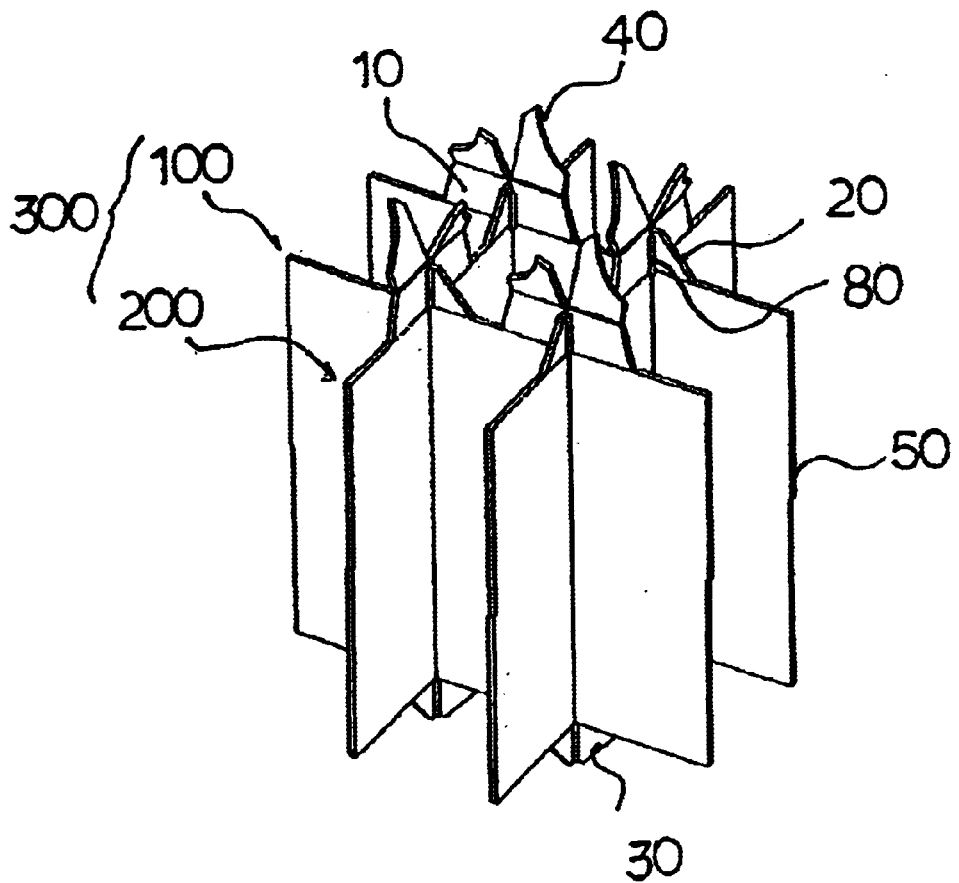

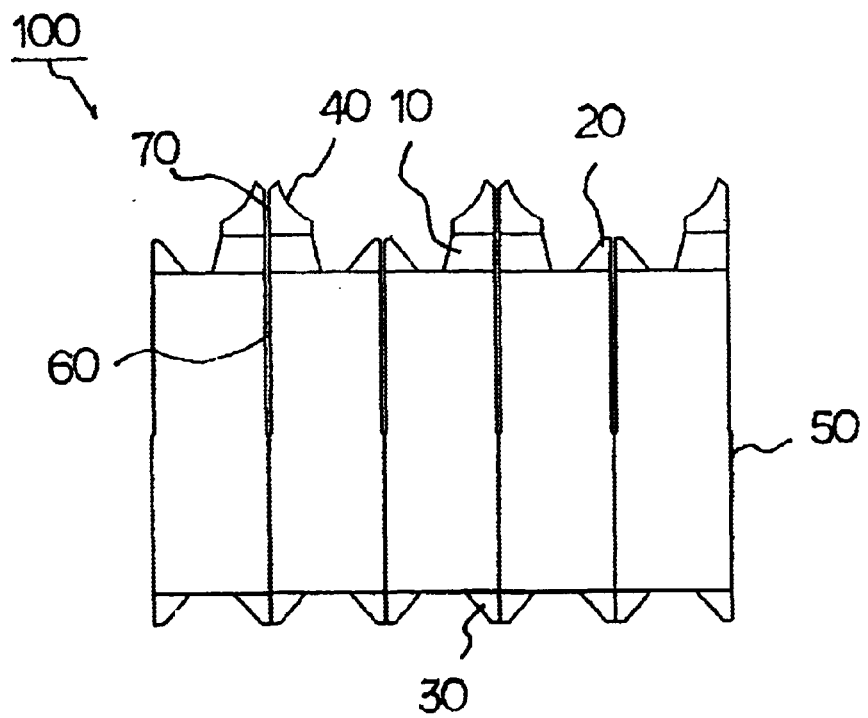
--Fig. 8--
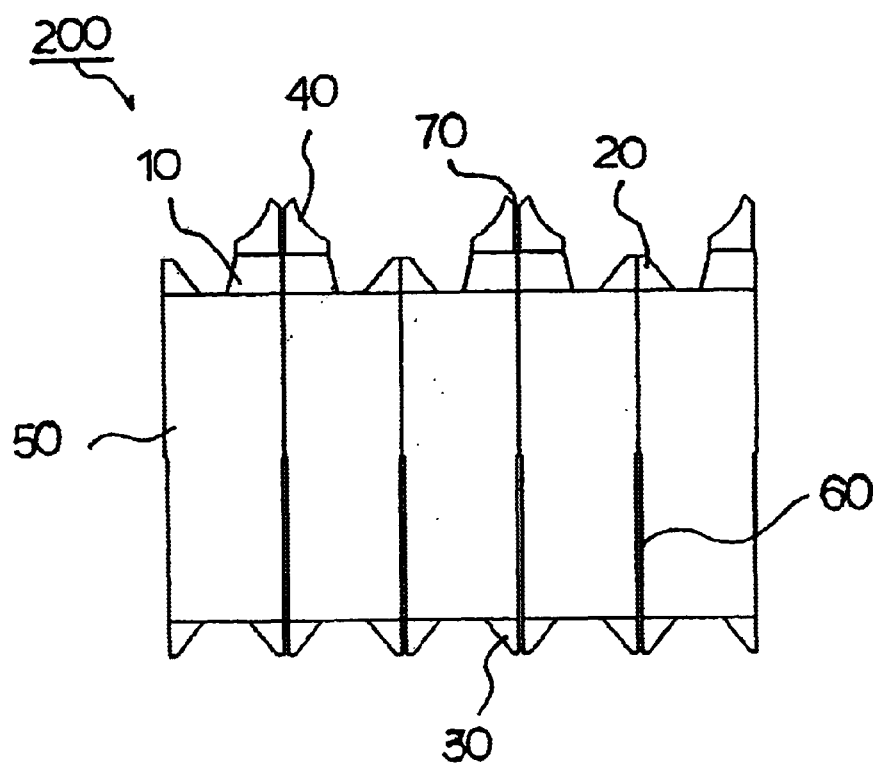
--Fig. 9--

--Fig. 10--
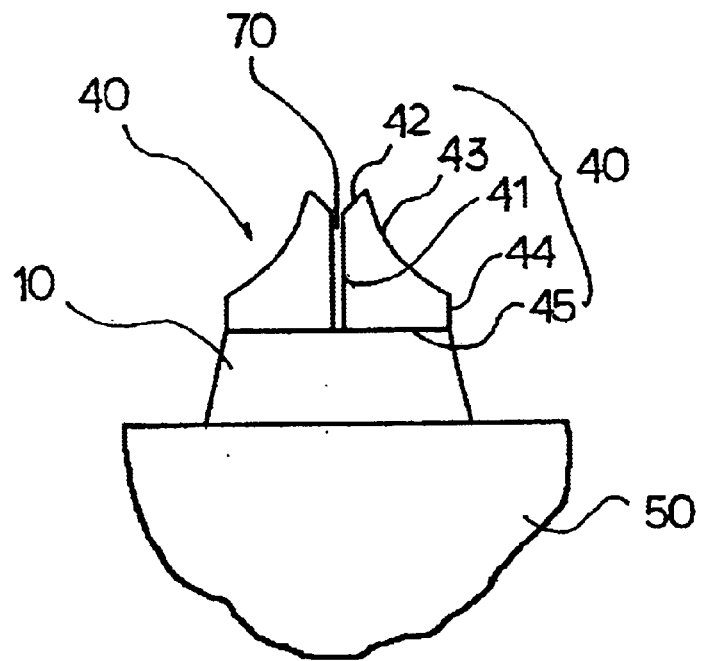
--Fig. 11--
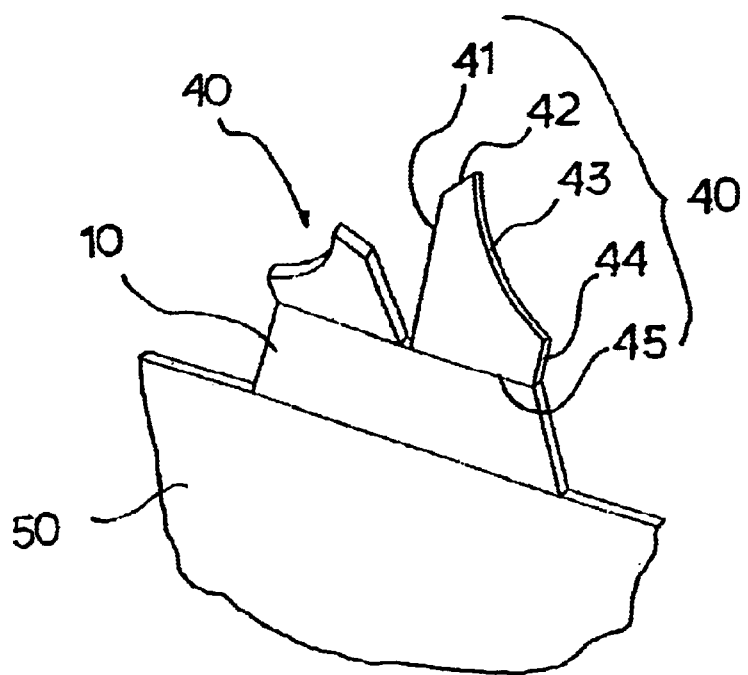

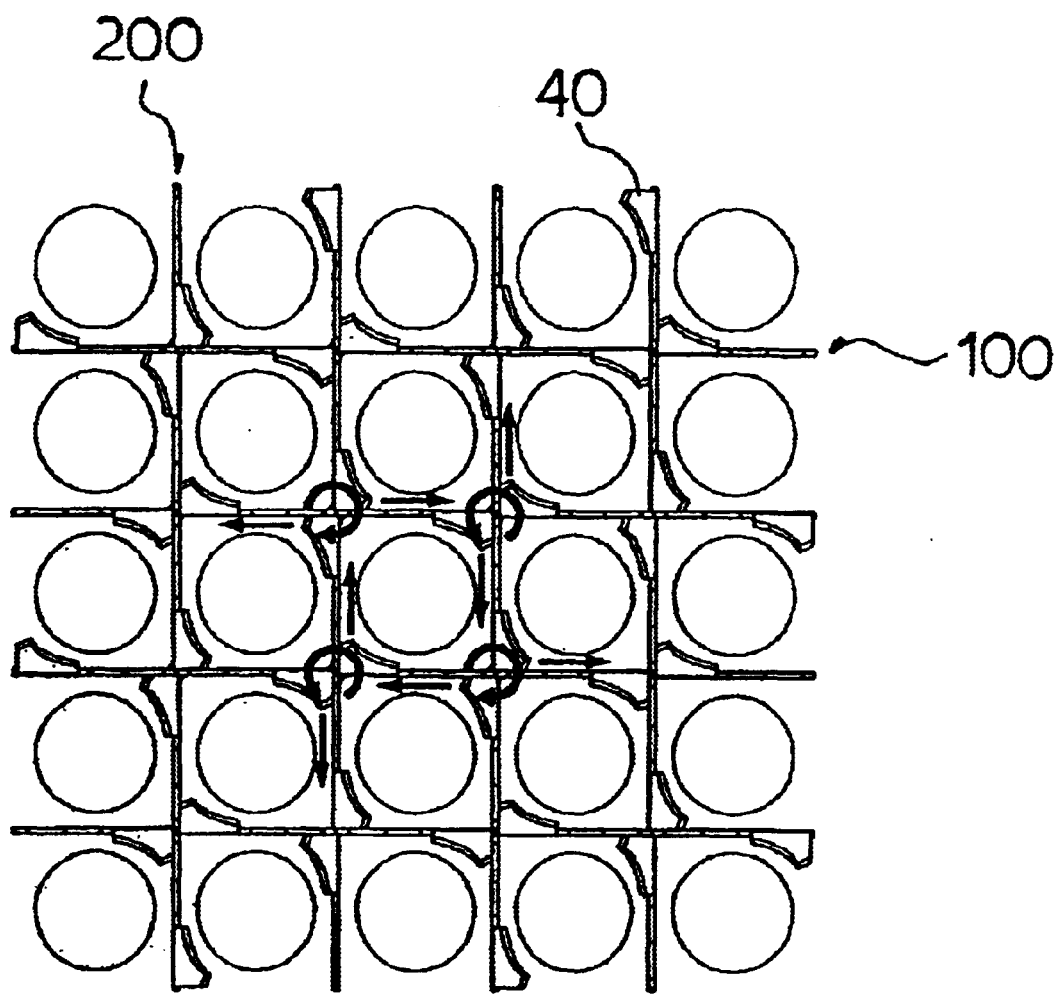
--Fig. 12--

--Fig. 13--
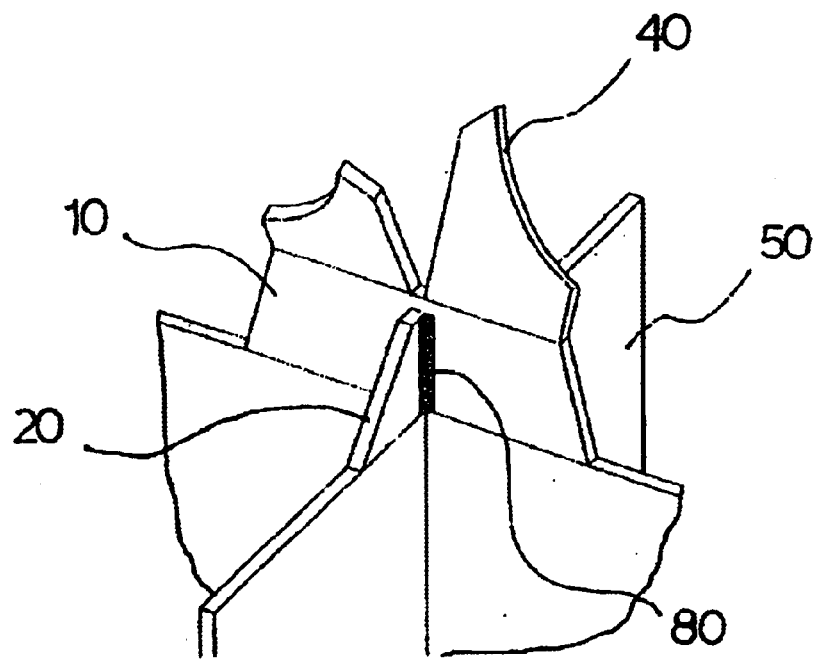
--Fig. 14--
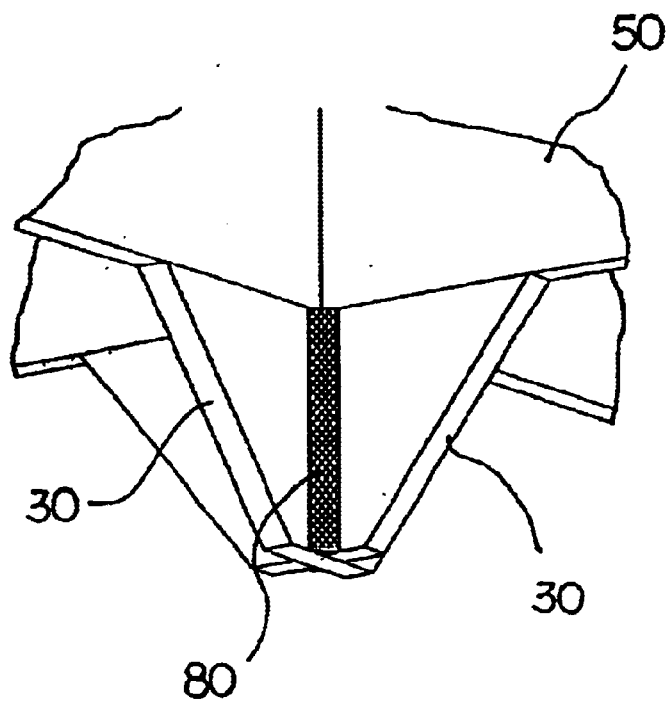

US 6,721,384 B2

SPACER GRID WITH SIDE WELDING SUPPORT AND FLOW MIXING VANE FOR NUCLEAR REACTOR FUEL ASSEMBLY

BACKGROUND OF THE INVENTION

1. Field of the Invention

The present invention relates, in general, to spacer grids used for supporting fuel rods in nuclear fuel assemblies and, more particularly, to a spacer grid provided with side weld supports and flow mixing vanes at the intersections of its inner straps for creating a lateral flow of coolant within coolant channels, in addition to improving the structural strength of the spacer grid and the integrity of the nuclear fuel assembles.

2. Description of the Prior Art

As shown in FIG. 1, a conventional nuclear fuel assembly 500 of a nuclear reactor comprises a plurality of fuel rods 502, each fabricated such that a fissionable fuel material, such as a uranium pellet, is contained in a hermetically sealed elongated tube, known as the cladding. The fuel rods 502 are supported within the fuel assembly by a plurality of spacer grids 501, which also generate a strong turbulent flow of coolant within the fuel assembly. The bottom of the fuel assembly is covered with a bottom end piece 503, which stably connects the fuel rods 502 to the lower structure of a reactor core. The top of the fuel assembly is covered with a top end piece 504, which stably connects the fuel rods 502 to the upper structure of the reactor core. In the fuel assembly, the spacer grids 501 and the two end pieces 503 and 504 are integrated into a single structure using a plurality of guide tubes 505. The guide tubes 505 also form a plurality of passages for receiving a variety of monitoring tubes used for measuring the operational conditions of the reactor.

As shown in FIG. 2, each spacer grid 501 is produced by intersecting a plurality of thin metal inner straps at right angles to form an egg-crate pattern, and spot-welding the interlaced straps at the top and bottom of their intersections, and so a desired integrity of the spacer grid 501 is accomplished. A plurality of flow mixing vanes 540 are provided on the top of each intersection of the spacer grid 501 for changing a portion of axial flow coolant 510 to cross flow 520 or swirl flow 530. The spacer grid 501, fabricated by the interlaced inner straps, defines a plurality of four-walled cells for receiving and holding the fuel rods 502 therein as shown in FIG. 3. In each of the cells, a plurality of grid springs 560 and a plurality of strong dimples 570 are formed on the inner straps such that the springs 560 and dimples 570 face each other. The springs 560 and dimples 570 support the fuel rods 502 in the spacer grids 501.

In the fuel assembly, the fuel rods 502 are axially set in the cells of the spacer grids 501 such that four fuel rods 502 inside four adjacent cells of each spacer grid 501 form a coolant channel 550' as shown in FIG. 4, and so the coolant axially flows along the channel 550'. The coolant channel 550' is open at each side thereof by a gap formed between two fuel rods 502, and has an intersection of the inner straps at the center thereof. The fuel rods of a nuclear fuel assembly typically have different thermal outputs due to an imbalance in the neutron flux distribution, and so the coolant flowing through some coolant channels surrounded by fuel rods having high thermal outputs is highly increased in its temperature in comparison with the coolant flowing through other coolant channels surrounded by fuel rods having low thermal outputs. In order to improve thermal efficiency of a reactor core, it is necessary to accomplish a uniform coolant temperature distribution within the coolant channels. The above objective may be accomplished by a provision of flow mixing vanes on the top of the spacer grid. That is, the flow mixing vanes accomplish a uniform coolant temperature distribution and prevent a part of the coolant from being overheated during an operation of a nuclear reactor.

When the coolant passes through the spacer grids, frictional and form pressure losses are presence due to the friction between the coolant and surface of the grid and the momentum exchange as area change of the flow path, respectively.

Such pressure losses result in an energy loss, which requires high capacity of main coolant pump to compensate the losses. Therefore, it is preferred to design the nuclear reactor system with low pressure losses.

The nuclear fuel assembly is fabricated by mounting the upper and lower end pieces to the bundle formed by inserting the fuel rods in the spacer grids. On inserting in the spacer grids, the fuel rods may contact with the vanes and cause the vane deformation, which may scratch the external surfaces of the fuel rods. Therefore, in the prior art, the flow mixing vanes of the spacer grid have been designed such that they do not interfere with the fuel rods.

Conventional flow mixing vanes for spacer grids may be referred to U.S. Pat. No. 4,692,302 (Inventors: Edmund E. Demario et al., Applicant: Westinghouse Co. Ltd.) and U.S. Pat. No. 5,440,599 (Inventors: Thomas Rodack et al., Applicant: Combustion Engineering Co. Ltd.).

In a flow mixing device disclosed in U.S. Pat. No. 4,692,302, two flow mixing vanes are formed at each intersection of the inner straps of a spacer grid such that the two vanes are formed along the top edge of one of two inner straps crossing each other at the intersection and are deflected in opposite directions. This flow mixing device changes a portion of coolant along the central axis of each channel to a cross flow guided to the gaps between fuel rods.

In the above flow mixing device, a weld window 580 and a weld tap 590 are provided at the gap between two flow mixing vanes 540 as shown in FIGS. 5 and 6.

The interlaced straps are welded at the upper and lower intersection and then the welding taps 590 are changed into weld beads 590'. The weld beads 590' increase hydraulic resistance by generating flow separation downstream of the beads thereof, thus reducing the flow mixing efficiency of the vanes 540. In addition, the weld window 580 positioned between two vanes 540 makes the edges of the two vanes become closer to the rod, thus may allowing an interference of the vanes 540 with the fuel rods.

In a flow mixing device disclosed in U.S. Pat. No. 5,440,599, a triangular vane support extends upward from the top edge of one of two inner straps crossing each other at each intersection, with two mixing vanes formed on opposite sides of the triangular vane support and deflected in opposite directions.

This flow mixing device changes a portion of coolant along the central axis of the channel to the gaps between the fuel rods. However, this flow mixing device is problematic in that a weld tap is provided under the vane support and becomes a weld bead when welding the interlaced inner straps together.

The weld beads 590' increase hydraulic resistance by generating flow separation downstream of the beads thereof, thus reducing the flow mixing efficiency of the vanes 540.

SUMMARY OF THE INVENTION

Accordingly, the present invention has been made keeping in mind the above problems occurring in the prior art, and an objective of the present invention is to provide a spacer grid for nuclear fuel assemblies, which has a plurality of side weld supports, that is, main supports, upper sub-supports and lower sub-supports, on its interlaced inner straps, with two flow mixing vanes integrally extending upward from each of the main supports, and which is fabricated by seam-welding the interlaced inner straps to each other along the upper axial junction lines of the crossing main and upper sub-supports at the top of the intersections, and along the lower axial junction lines of the crossing lower sub-supports at the bottom of the intersections, and which prevents the flow mixing vanes from interfering with fuel rods during a fuel rod installation process, accomplishes a desired integrity, improves the coolant mixing efficiency of the flow mixing vanes, and reduce form pressure loss caused by weld beads.

In order to accomplish the above objects, the present invention provides a spacer grid used in a nuclear fuel assembly such that a plurality of spacer grids are regularly and transversely arranged along the fuel assembly to support a plurality of fuel rods within the fuel assembly while maintaining a desired pitch of the fuel rods, comprising:

A plurality of first inner straps each having a rectangular-shaped first strap body, with a plurality of main supports and a plurality of upper sub-supports alternately formed along a top edge of the first strap body while being spaced apart from each other at regular intervals, a plurality of lower sub-supports formed along a bottom edge of the first strap body while being spaced apart from each other at regular interval, a pair of flow mixing vanes symmetrically formed along a top edge of each of said main supports, and a plurality of upper vertical slits extending from center of top edge of each said main supports and each upper sub-supports of the first strap body toward a middle of said first strap body; and A plurality of second inner straps each having a rectangular-shaped second strap body, with a plurality of main supports and a plurality of upper sub-supports alternately formed along a top edge of the second strap body while being spaced apart from each other at regular intervals, a plurality of lower sub-supports formed along a bottom edge of the second strap body while being spaced apart from each other at regular interval, a pair of flow mixing vanes symmetrically formed along a top edge of each of said main supports of the second strap body, and a plurality of lower vertical slits extending from center of bottom edge of each said lower sub-supports of the second strap body toward a middle of said second strap body;

whereby said first and second inner straps are interlaced at right angles at the vertical slits such that the interlaced inner straps form a plurality of square cells for receiving the fuel rods, with the main supports of the first and second inner strap crossing the upper sub-supports of the second and first inner straps while forming a plurality of upper axial junction lines, and the lower sub-supports of the first and second inner straps crossing each other while forming a plurality of lower axial junction lines, said inner straps being seam-welded to each other along the upper and lower junction lines to form a plurality of side weld lines, and said flow mixing vanes of the interlaced inner straps guiding axial flows of coolant to gaps between the fuel rods, thus forming cross flows of coolant.

BRIEF DESCRIPTION OF THE DRAWINGS

The above and other objectives, features and other advantages of the present invention will be more clearly understood from the following detailed description taken in conjunction with the accompanying drawings, in which:

FIG. 2 is a perspective view of a part of a conventional spacer grid for such nuclear fuel assemblies;

FIG. 3 is a plan view of four cells of the conventional spacer grid, with a fuel rod set within each of the cells;

FIG. 4 is a plan view of a coolant channel defined within a spacer grid by four fuel rods;

FIG. 5 is a front view of conventional flow mixing vanes for spacer grids;

FIG. 6 is a plan view of the conventional flow mixing vanes of FIG. 5;

FIG. 7 is a perspective view of a part of a spacer grid for nuclear fuel assemblies in accordance with the preferred embodiment of the present invention;

FIG. 8 is a front view of a first inner strap of the spacer grid according to this invention;

FIG. 9 is a front view of a second inner strap of the spacer grid according to this invention;

FIG. 10 is an enlarged front view of flow mixing vanes of the spacer grid according to this invention;

FIG. 11 is an enlarged perspective view of the flow mixing vanes according to this invention;

FIG. 12 is a plan view of the spacer grid according to the present invention, showing cross flows and swirl flows of coolant formed by the flow mixing vanes;

FIG. 13 is a perspective view of an upper welded part of the spacer grid according to the present invention; and FIG. 14 is a perspective view of a lower welded part of the spacer grid according to the present invention.

DESCRIPTION OF THE PREFERRED EMBODIMENTS

Figure 1:
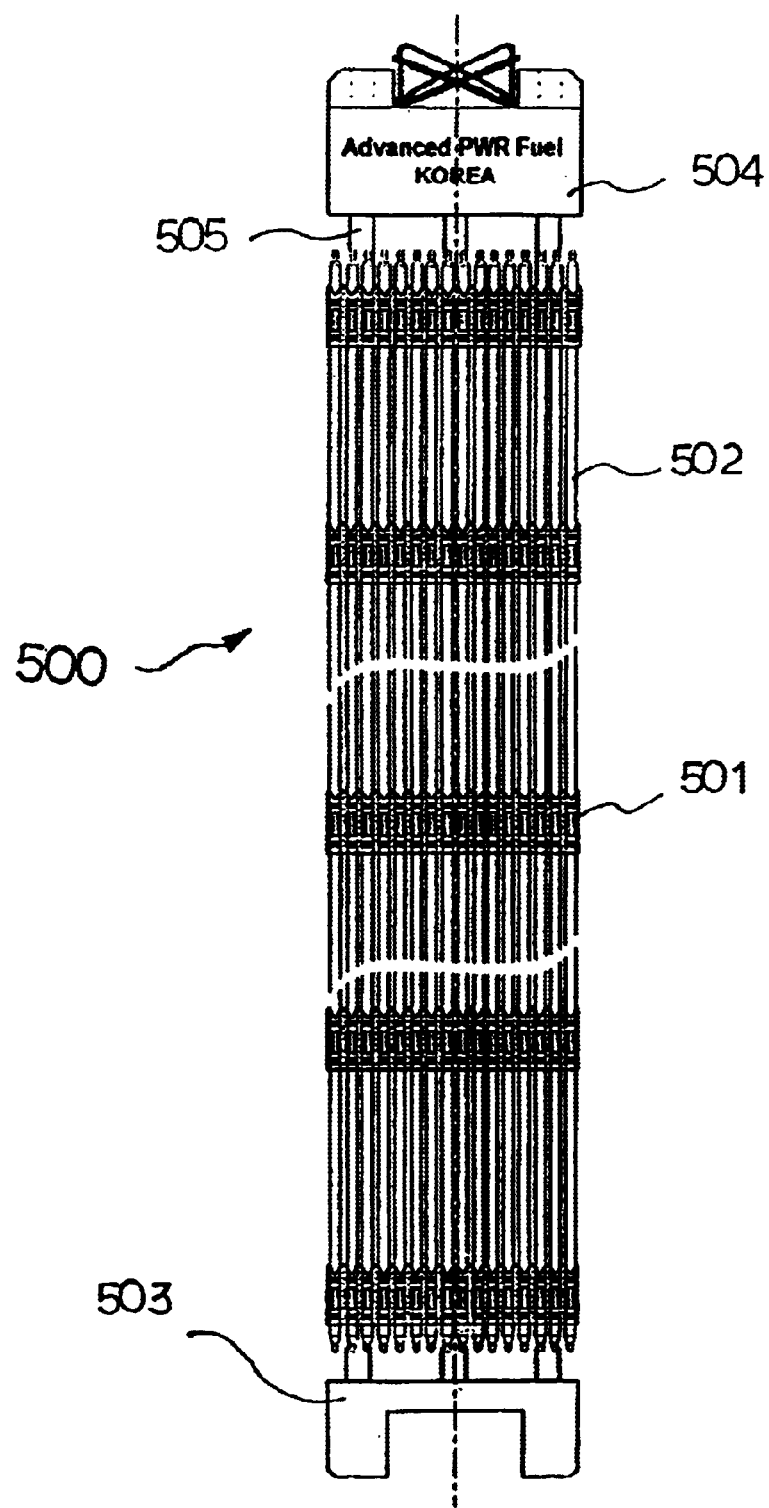
FIG. 1 is a view of a conventional nuclear fuel assembly.

FIG. 7 is a perspective view of a part of a spacer grid for nuclear fuel assemblies in accordance with the preferred embodiment of the present invention. FIG. 12 is a plan view of the spacer grid of this invention. FIG. 13 is a perspective view of an upper welded part of the spacer grid of this invention. FIG. 14 is a perspective view of a lower welded part of the spacer grid of this invention. In order to produce the spacer grid 300 of this invention, two types of inner straps are interlaced prior to being welded together at the intersections. For ease of description, the two types of interlaced inner straps are referred to as first inner straps 100 and second inner straps 200, respectively. As shown in the drawings, each of the first and second inner straps 100 and 200 is provided with a plurality of side weld supports, that is, main supports 10, upper sub-supports 20 and lower sub-supports 30. The main supports 10 and the upper sub-supports 20 are alternately and integrally formed along the top edge of each inner strap 100 or 200, while the lower sub-supports 30 are formed along the bottom edge of each inner strap 100 or 200. Two flow mixing vanes 40 integrally extend upward from the top of each main support 10 for accomplishing a desired flow mixing effect. Each of the first inner straps 100 is vertically slit downward from center of the top edge of each main supports and each upper sub-supports of the first strap body toward the middle of the first strap body, thus having a plurality of upper vertical slits 60.

Each of the second inner straps 200 is also vertically slit upward from center of the bottom edge of each lower sub-supports 30 of the second strap body toward the middle of the second strap body, thus having a plurality of lower vertical slits 60.

The first and second inner straps 100 and 200 are interlaced together at right angles to the vertical slits 60 to fabricate a spacer grid 300 having a plurality of four-walled cells for the fuel rods with the opening.

The main support 10 of an inner strap crosses the upper sub-support 20 of the other inner strap at the top of interlaced spacer grid 300.

The lower sub-supports of an inner strap crosses cross the lower sub-support 20 of the other inner strap at the lower of interlaced spacer grid 300.

That is, the main supports 10, the upper sub-supports 20 and the flow mixing vanes 40 are provided on the top edges of the interlaced first and second inner straps of the spacer grid at the intersections, while the lower sub-supports 30 are provided on the bottom edge of the interlaced first and second inner straps at the intersections.

Two flow mixing vanes 40 integrally extend upward from the top of each main support 10.

The main supports 10 integrated with the flow mixing vanes 40 and the upper sub-supports 20 are alternately arranged along the top edge of each inner strap while being spaced apart from each other at regular intervals.

The main supports 10 integrally extend upward from the top edge of each strap body 50 of the interlaced inner straps 100 and 200.

The strap body 50 has a longitudinal rectangular shape when viewed from a side of the spacer grid, and has a linear shape when viewed from the top of the spacer grid.

Each of the main supports 10 has an equilateral trapezoidal shape, the top edge of which is parallel to the bottom edge that forms the junction line of the support 10 and the strap body 50.

The flow mixing vanes 40 are formed on the inner straps for accomplishing desired flow mixing effect of the spacer grid.

As shown in FIGS. 10 and 11, two flow mixing vanes 40 are integrated at their bottom edges with the top edge of each main support 10, with a vane gap 70 formed between the two vanes 40.

The two mixing vanes 40 of each main support 10 face each other while being rotationally symmetrical with each other about crossing line of the first and second inner straps 100 and 200. Each of the two mixing vanes 40 has a specifically designed polygonal shape with a plurality of edges, that is, first to fourth edges and base portion of the vane 41, 42, 43, 44 and 45. The first edge 41 is perpendicular to the top edge of the main support 10, while the second edge 42 extends upward from the top end of the first edge 41 while forming an obtuse angle between them. The third edge 43 extends downward from the top end of the second edge 42 while being curved with a predetermined degree of curvature. The fourth edge 44 extends between the top edge of the main support 10 and the third edge 43 while being parallel to the first edge 41. The base portion of the vane 45 bending along the bottom points of the first and fourth edges 41 and 44, and is integrated with the top edge of the main support 10. Two flow mixing vanes 40 are integrally formed along the top edge of each main support 10 while facing each other and positioning a vane gap 70 between their first edges 41. The top edge of the main support 10 is integrated with the bottom edge (base portion of the vane 45) of each vane 40 to form a junction line. The fourth edge 44 of each vane 40 is shorter than the first edge 41. The two flow mixing vanes 40 of each main support 10 are deflected along their base portions at a predetermined angle in opposite directions. The vane gap 70 left between the two vanes 40 maintains the same gap as the pitch of the fuel rods.

As described above, two flow mixing vanes 40 are integrated along their bottom portions with the top portions of each main support 10 while forming a junction line, and extend upward while being deflected in opposite directions. In such a case, the peaks of the vanes 40 are directed toward the gaps between the fuel rods set in the four-walled cells of the spacer grid. The vanes 40 thus change a portion of axial flow of coolant to a cross flow and a swirl flow.

When the first and second inner straps 100 and 200 are interlaced together to form a spacer grid 300, each upper sub-support 20 of a strap 100 or 200 crosses a main support 10 of another strap, and is welded to said main support 10 through a seam-welding process to form side weld lines 80 as shown in FIG. 13. The upper sub-supports 20 and the main supports 10 are alternately arranged along the top edge of each inner strap while being spaced apart from each other at regular intervals. In addition, each lower sub-support 30 of an inner strap 100 or 200 crosses a lower sub-support 30 of another strap, and is welded to said lower sub-support 30 through a seam-welding process to form side weld lines 80 as shown in FIG. 14. The lower sub-supports 30 are repeatedly formed along the bottom edge of each inner strap while being spaced apart from each other at regular intervals. Each of the upper and lower sub-supports 20 and 30 has a triangular shape.

FIG. 8 is a front view of the first inner strap 100 of the spacer grid according to this invention. As shown in the drawing, the first inner strap 100 consists of a first strap body 50 having a rectangular shape, with a plurality of main supports 10 integrated at their bottom edges with the top edge of the strap body 50. Two flow mixing vanes 40 are integrated along their bottom portions with the top portion of each main support 10. The first inner strap 100 also has a plurality of upper sub-supports 20, which are integrated along their bottom portions with the top edge of the strap body 50 at regularly spaced positions. The main supports 10 and the upper sub-supports 20 of the first inner strap 100 are alternately formed along the top edge of the strap body 50 while positioning predetermined regular intervals between them. A plurality of upper vertical slits 60 are formed on the strap body 50 of the first inner strap 100 at positions corresponding to the main supports 10 and the upper sub-supports 20. The upper vertical slits 60 between the main supports 10 extend through the centers of the main supports 10 to communicate with vane gaps 70, and extend through the strap body 50 toward the middle of said body 50. The upper vertical slits 60 between the upper sub-supports 20 extend through the centers of the sub-supports 20, and extend through the strap body 50 toward the middle of said body 50. A plurality of lower sub-supports 30 are integrated with the bottom edge of the strap body 50.

That is, the vertical slits 60 are formed on the strap body 50 of the first inner strap 100 at regularly spaced positions so as to allow the first inner straps 100 to be interlaced with second inner straps 200 at the slits 60. The above slits 60 extend from the top edge of the strap body 50 toward the middle of the body 50. In addition, the main supports 10 and the upper sub-supports 20 are alternately formed along the top edge of the strap body 50 of the first inner strap 100, and are used as side weld supports. In the first inner strap 100, each of the main supports 10 has an equilateral trapezoidal shape, and each of the upper sub-supports 20 has a triangular shape, preferably an isosceles triangular shape. Two flow mixing vanes 40 are formed on each main support 10 such that the bottom portion of each vane 40 is integrated with the top portion of the main support 10 to form a junction line. In addition, the lower sub-supports 30 are formed along the bottom edge of the strap body 50 and used as side weld supports.

The upper and lower sub-supports 20 and 30 of the first inner strap 100 define areas allowing a seam-welding to form the side weld lines 80.

The lower sub-supports 30 also gradually reduce the cross section area of the coolant channel at the bottom of the spacer grid 300, thus reducing form pressure loss caused by a variation in the cross section area of the coolant channels.

The vertical slits 60 of the first inner strap 100 are regularly spaced at the same interval as a desired pitch of the fuel rods inside the fuel assembly.

FIG. 9 is a front view of a second inner strap 200 of the spacer grid 300 of this invention.

As shown in the drawing, the second inner strap 200 consists of a second strap body 50 having a rectangular shape, with a plurality of main supports 10 integrated at their bottom portions with the top edge of the strap body 50. Two flow mixing vanes 40 are integrated along their bottom portions with the top portion of each main support 10 of the second inner strap 200. The second inner strap 200 also has a plurality of upper sub-supports 20, which are integrated along their bottom portions with the top edge of the strap body 50 at regularly spaced positions.

The main supports 10 and the upper sub-supports 20 of the second inner strap 200 are alternately formed along the top edge of the strap body 50 while positioning predetermined regular intervals between them.

A plurality of lower sub-supports 30 are integrated with the bottom edge of the strap body 50. A plurality of lower vertical slits 60 are formed on the strap body 50 of the second inner strap 200 at positions corresponding to the lower sub-supports 30. The lower vertical slits 60 between the lower sub-supports 30 extend through the centers of the sub-supports 30, and extend through the strap body 50 toward the middle of said body 50. That is, the lower vertical slits 60 are formed on the strap body 50 of the second inner strap 200 at regularly spaced positions so as to allow the second inner straps 200 to be interlaced with first inner straps 100 at the slits 60. The above slits 60 extend from the bottom edge of the strap body 50 toward the middle of the body 50. The vertical slits 60 of the second inner strap 200 are regularly spaced at the same interval as a desired pitch of the fuel rods inside the fuel assembly.

In the present invention, the designation of the two types of interlaced inner straps as the first and second inner straps 100 and 200 is only for ease of description. The first and second inner straps 100 and 200 have the same construction, but are different from each other in the positions of their vertical slits 60. Therefore, it is possible to design the two types of inner straps such that the first inner straps 100 have the lower vertical slits 60 at positions between the lower sub-supports, and the second inner straps 200 have the upper vertical slits 60 at positions between the main supports 10 and the upper sub-supports 20.

In order to fabricate a spacer grid 300 of this invention, the first and second inner straps 100 and 200 are interlaced together at right angles at their vertical slits 60 such that the main supports 10 of the first strap 100 cross the upper sub-supports 20 of the second strap 200 and the upper sub-supports 20 of the first straps 100 cross the main supports 10 of the second straps 200.

When intersecting the first and second inner straps 100 and 200 as described above, the lower sub-supports 30 of the first and second straps 100 and 200 cross each other at right angles.

In a brief description, at the top of the spacer grid 300, the main supports 10 of the first and second inner straps 100 and 200 cross the upper sub-supports 20 of the second and first straps 200 and 100.

At the bottom of the spacer grid 300, the lower sub-supports 30 of the first and second straps 100 and 200 cross each other.

After intersecting the first and second inner straps 100 and 200 as described above, the interlaced straps 100 and 200 are welded together along the upper axial junction lines of the main supports 10 and the upper sub-supports 20 through a seam-welding process to form two diagonally opposite side weld lines 80 at each intersection as shown in FIG. 13.

In addition, the lower axial junction lines of the lower sub-supports 30 of the interlaced inner straps 100 and 200 are welded through a seam-welding process, thus forming two diagonally opposite side weld lines 80 at each intersection as shown in FIG. 14.

Due to such side weld lines 80 formed at the top and bottom of the intersections of the first and second inner straps 100 and 200, it is possible to reduce form pressure loss caused by the welded parts of the spacer grid 300, in addition to accomplishing a firm and balanced integration of the interlaced inner straps 100 and 200 at the top and bottom of the intersections.

When fabricating the spacer grid of this invention, the first and second inner straps are interlaced at right angles such that the main supports and upper sub-supports of the interlaced inner straps cross each other forming the upper axial junction lines. The interlaced inner straps are welded to each other along the upper axial junction lines at each intersection to form two diametrically opposite side weld lines providing desired integrity of the top of the spacer grid.

In addition, at the bottom of the intersections, the lower sub-supports of the interlaced inner straps cross each other at right angles to form the lower axial junction lines. The interlaced inner straps are welded together along the lower axial junction lines at each intersection to form two diagonally opposite side weld lines providing a desired integrity at the bottom of the spacer grid. The interlaced first and second inner straps each have two flow mixing vanes extending upward from the top portion of each main support, thus changing a portion of axial flow of coolant to cross flow and swirl flow.

FIG. 12 is a plan view of the spacer grid according to the present invention, showing the cross flows and swirl flows of coolant formed by the flow mixing vanes.

When the coolant passes through the channels of the spacer grid, the coolant comes into contact with the flow mixing vanes. The axial flows of coolant within the coolant channels are thus changed to the cross flows and swirl flows as shown by the arrows of the drawing.

In such a case, the cross flow of coolant formed by the mixing vanes flows in a diagonal direction inside the spacer grid, while the swirl flow of coolant within each coolant channel swirls in a direction opposite to the swirling direction of coolant in a neighboring channel.

As described above, the present invention provides a spacer grid with side weld supports and flow mixing vanes for nuclear fuel assemblies.

In the spacer grid of this invention, the interlaced inner straps are provided with main supports and upper sub-supports along their top edges. The inner straps also have lower sub-straps along their bottom edges. When intersecting the inner straps at right angles, the main supports cross the upper sub-supports to form upper axial junction lines at the top of the interlaced straps, while the lower sub-supports cross each other to form lower axial junction lines at the bottom of the interlaced straps. The interlaced inner straps are seam-welded together along at least one of each of four upper and four lower axial junction lines formed at each intersection to form a plurality of side weld lines. Due to such side weld lines, it is possible to accomplish a desired integrity of the spacer grid. In addition, the structural strength of the spacer grid is controlled by controlling the position and length of the side weld lines.

The seam-welded spacer grid of the present invention does not have weld windows or weld taps at its interlaced inner straps different from conventional spot-welded spacer grids. Since the spacer grid does not have the weld taps, any weld bead is not formed at the side weld lines of the grid. This spacer grid is thus free from form pressure loss caused by such weld beads.

Since the spacer grid of this invention does not have the weld windows at the flow mixing vanes, the amount of coolant leaking through the weld windows is reduced, so the coolant mixing efficiency of the vanes is improved.

In addition, the removal of the conventional weld windows from the flow mixing vanes of this spacer grid preferably reduces the bottom width and height of the vanes, and preferably increases the distance between the vanes and the fuel rods in comparison with conventional spacer grids. Therefore, it is possible to reduce damage, such as scratches, to the fuel rods by the flow mixing vanes during a process of inserting the fuel rods in the spacer grid to form a the fuel assembly.

The main and sub-supports used as the side weld supports of this spacer grid respectively have a trapezoidal shape and a triangular shape capable of making a smooth variation in the cross section area of the coolant channels. Therefore, the spacer grid of this invention preferably reduces the form pressure loss caused by a variation in the cross section area at the inlet and outlet of the coolant channels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spacer grid used in a nuclear fuel assembly such that a plurality of spacer grids are regularly and transversely arranged along the fuel assembly to support a plurality of fuel rods within the fuel assembly while maintaining a desired pitch of the fuel rods and promoting the mixing of a coolant flowing longitudinally upwardly along nuclear fuel rods, comprising:
   a plurality of first inner straps each having a rectangular-shaped first strap body, with a plurality of main supports and a plurality of upper sub-supports alternately formed along a top edge of the first strap body while being spaced apart from each other at regular intervals, a plurality of lower sub-supports formed along a bottom edge of the first strap body while being spaced apart from each other at regular interval, a pair of flow mixing vanes symmetrically formed along a top edge of each of said main supports, and a plurality of upper vertical slits extending from center of top edge of each said main supports and each upper sub-supports of the first strap body toward a middle of said first strap body; and
   a plurality of second inner straps each having a rectangular-shaped second strap body, with a plurality of main supports and a plurality of upper sub-supports alternately formed along a top edge of the second strap body while being spaced apart from each other at regular intervals, a plurality of lower sub-supports formed along a bottom edge of the second strap body while being spaced apart from each other at regular interval, a pair of flow mixing vanes symmetrically formed along a top edge of each of said main supports of the second strap body, and a plurality of lower vertical slits extending from center of bottom edge of each said lower sub-supports of the second strap body toward a middle of said second strap body;
   whereby said first and second inner straps are interlaced at right angles at the vertical slits such that the interlaced inner straps form a plurality of square cells for receiving the fuel rods, with the main supports of the first and second inner strap crossing the upper sub-supports of the second and first inner straps while forming a plurality of upper axial junction lines, and the lower sub-supports of the first and second inner straps crossing each other while forming a plurality of lower axial junction lines, said inner straps being seam-welded to each other along the upper and lower junction lines to form a plurality of side weld lines, and said flow mixing vanes of the interlaced inner straps guiding axial flows of coolant to gaps between the fuel rods, thus forming cross flows of coolant.

2. The spacer grid according to claim 1, wherein said upper and lower vertical slits of the first and second inner straps, and a plurality of vane gaps each formed between the two flow mixing vanes of each of the main supports of said second inner straps are spaced apart from each other at the same interval as a pitch of the fuel rods.

3. The spacer grid according to claim 1, wherein the two flow mixing vanes, formed on each of the main supports of the first and second inner straps and disposed in a central region of a flow channel, are rotationally symmetrical about crossing line of the first and second inner straps.

4. The spacer grid according to claim 1, wherein the two flow mixing vanes, formed on each of the main supports of the first and second inner straps, are deflected in opposite directions, with peaks of said flow mixing vanes directed toward the gaps between the fuel rods set in the square cells.

5. The spacer grid according to claim 1, wherein each of said main supports of the first and second inner straps has an equilateral trapezoidal shape, with a top edge of said main support being integrated with the two flow mixing vanes and being parallel to a bottom edge integrated with the top edge of an associated strap body.

6. The spacer grid according to claim 1, wherein each of said upper and lower sub-supports of the first and second inner straps is integrated with the bottom edge of an associated strap body and has an isosceles triangular shape.

7. The spacer grid according to claim 1, wherein said interlaced first and second inner straps are seam-welded together along at least one of each of four upper and four lower axial junction lines formed at each intersection.

8. The spacer grid according to claim 1, wherein the two flow mixing vanes, formed on each of the main supports of the first and second inner straps, each have a first edge perpendicular to the top edge of the main support, a second edge extending upward from a top end of said first edge while forming an obtuse angle between the first and second edges, a third edge extending downward from a top end of said second edge while being curved with a predetermined curvature, a fourth edge extending between the top edge of the main support and the third edge while being parallel to the first edge, and a base portion of the vane bending along bottom points of the first and fourth edges while being integrated with the top edge of the main support.

* * * * *